May 23, 1961 E. V. SCHNEIDER 2,985,029
DRIVE MECHANISM
Filed March 6, 1958 3 Sheets-Sheet 1

INVENTOR.
EMMOR V. SCHNEIDER
BY
Woodling and Kroot,
attys.

May 23, 1961 E. V. SCHNEIDER 2,985,029
DRIVE MECHANISM
Filed March 6, 1958 3 Sheets-Sheet 2

INVENTOR.
EMMOR V. SCHNEIDER
BY
Woodling and Krost,
attys.

May 23, 1961    E. V. SCHNEIDER    2,985,029
DRIVE MECHANISM
Filed March 6, 1958    3 Sheets-Sheet 3

INVENTOR.
EMMOR V. SCHNEIDER
BY
Woodling and Krost,
attys.

United States Patent Office 2,985,029
Patented May 23, 1961

2,985,029

DRIVE MECHANISM

Emmor V. Schneider, Alliance, Ohio, assignor to The Alliance Manufacturing Company, Division of Consolidated Electronics Industries Corporation, a corporation of Delaware Filed Mar. 6, 1958, Ser. No. 719,665

18 Claims. (Cl. 74—472)

The invention relates in general to drive mechanisms and more particularly to plural speed drive mechanisms which may be used for driving intermittent loads such as a timer mechanism varying input load requirements.

Electric motor driven timer mechanisms have been used before, such as timer mechanisms to control a plurality of switches in an automatic washing machine with this timer controlling various functions such as hot and cold water input, wash cycle, rinse cycle, spin dry cycle, and main on-off switch functions. Such motor driven time switches have generally been of the rotary variety with the rotary switch being not only motor driven for its time switch cycle functions but also manually operable to change the cycle times. In such a switch with additional manual operation, the switch itself must be so located as to be actually manually operable by the operator and hence cannot be at a remote location. Also, the length of various portions of the cycle cannot easily be controlled without an operator being in constant attendance to change the lengths of time.

Consequently, an object of the present invention is to provide a fully automatic timer for a time switch.

Another object of the invention is to provide a remotely controllable time switch.

Another object of the invention is to provide a time switch with a high speed and a low speed portion of a cycle.

Another object of the invention is to provide a time switch which is driven by an electric motor and which has high and low energization conditions.

Another object of the invention is to provide a drive mechanism having plural speeds which are remotely selectable.

Another object of the invention is to provide a timer drive mechanism wherein the timer is first driven at a high speed to select a particular cycle and then is driven at low speed once the proper cycle is selected.

Another object of the invention is to provide a two-speed gear train where a single motor drives both the high and the low speed gear trains and which are instantly shiftable without fear of stripping any of the gears.

Another object of the invention is to provide a two-speed gear shifting mechanism wherein the gears are generally radially shifted rather than axially, and the gear shifting is accomplished at places where the gear teeth are not moving rapidly so that the gear change is positive and smooth.

Another object of the invention is to provide a timer drive mechanism wherein the timer motor has high and low energization conditions and a power means is provided for gear shifting with switch means controlled by the motor output controlling both the high and low motor energization conditions and the power means for the gear shifting.

Other objects and a fuller understanding of this invention may be had by referring to the following description and claims, taken in conjunction with the accompanying drawing, in which:

Figure 4:
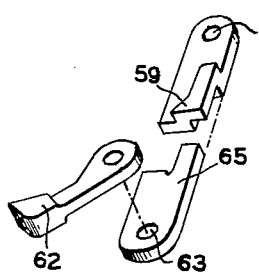
Figure 4 is an enlarged isometric view of the ratchet pawls.

Figures 1 through 4 show the timer drive mechanism 11 which generally includes a frame 12, a motor 13, a high gear train 14, a low speed gear train 15, a power shifting means 16, and an output switch means 17.

The motor 13 may be a sub-fractional horsepower motor of simple and rugged design such as a shaded pole induction motor. A two-pole motor of this type operating on sixty cycles has an output speed of about 3400 r.p.m. at a motor output shaft 20. This motor output shaft has first and second pinion sections 21 and 22, and in actual practice these two sections may be one long continuous pinion on the output shaft 20. A swingable lever 23 is movable at a first end 24 thereof and is pivoted at a second end 25 thereof about an axis 26. A large shiftable gear 29 is journalled on the lever 23 at a bearing 30, and a second gear 31 is coaxially and directly attached to the shiftable gear 29 to rotate therewith.

Figure 1:
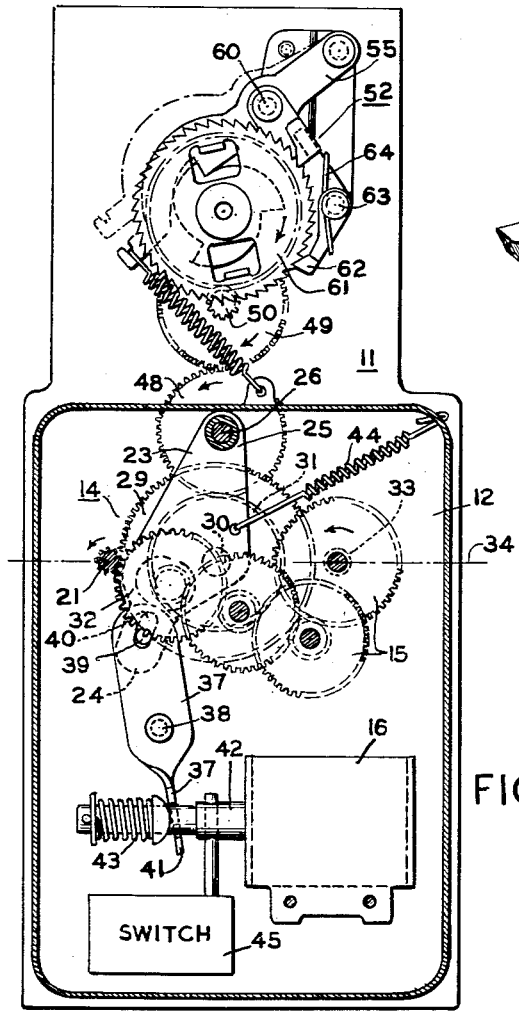
Figure 1 is a plan view with the cover removed of the timer drive mechanism.
Figure 2:
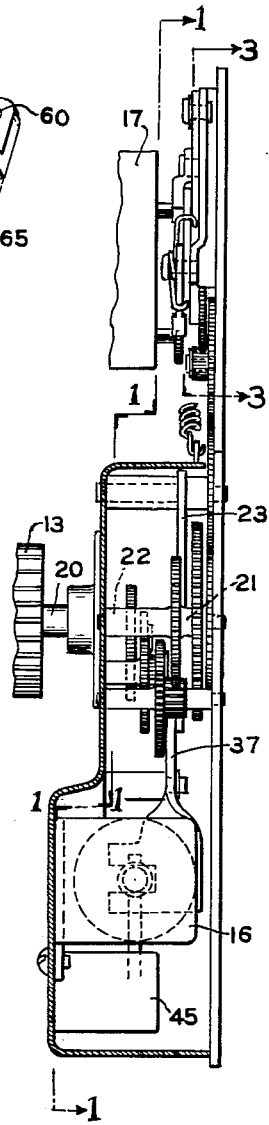
Figure 2 is a side view of Figure 1, partially in section.

The low speed gear train 15 is a power train having a total of four gear sets each comprising a gear and a pinion with the input gear 32 of this low speed gear train 15 constantly in mesh with the second pinion section 22. The low speed gear train 15 has an output pinion 33 which, because of the even plurality of gear sets in the gear train 15, rotates in the opposite direction relative to the input gear 32. The output pinion 33 is disposed in the plane of the shiftable gear 29 and is disposed on a line 34 substantially intersecting the axis of the motor shaft 21 and the axis of bearing 30. The lever 23 may be moved arcuately from a first position, as shown in Figure 1, whereat the large shiftable gear 29 is in mesh with the first pinion section 21, to a second position whereas the shiftable gear 29 will be in mesh with the output pinion 33.

A shift lever 37 is pivoted to the frame at 38, and one end has a pin 39 engaging a slot 40 in the swingable lever 23. The lower end 41 of the shift lever 37 engages the shaft 42 of the power shifting means 16 which has been shown as a solenoid. The solenoid shaft 42 acts through a compressible spring 43 onto the shift lever 37 for smooth and positive gear shifting movements. A tension spring 44 acts on the swingable lever 23 and through the shift lever 37 also acts on the solenoid shaft 42. Switch means 45 is directly actuated by the solenoid shaft 42.

Figure 3:
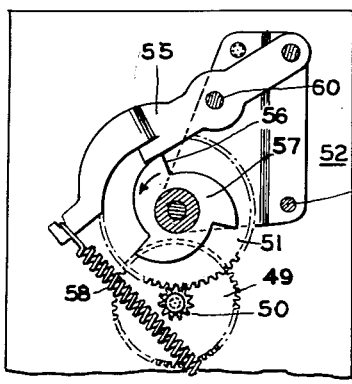
Figure 3 is a sectional view taken on line 3—3 of Figure 2.

The second gear 31 meshes with a first output gear 48 which is journalled at the pivot axis 26. This assures that, as the swingable lever 23 moves between the first and second positions thereof, the gears 31 and 48 will always remain properly in mesh. A second output gear 49 is also journalled on the frame 12 and carries a pinion 50 to slowly rotate a third output gear 51. This gear 51 drives the output switch means 17 through a ratchet mechanism 52. The ratchet mechanism 52 is an example of a load which has a rapidly varying input torque requirement and, in fact, has one which changes from normal load to substantially no load in a very short space of time. This is caused by a cam follower lever 55 dropping off a shoulder 56 of a drive cam 57 which cam is driven from the output gear 51. An extension spring 58 causes this rapid movement of the cam follower lever 55 and, upon such rapid movement, a drive pawl 59 pivotally connected at 60 to the lever 55 moves a ratchet wheel 61 one notch. As the cam 57 rotates counterclockwise, as seen in Figure 3, the lever 55 is retracted and the pawl 59 is retracted so as to be ready to engage the next succeeding notch on the ratchet wheel 61. During this retractile movement, a retract pawl 62 pivoted at 63 keeps the ratchet wheel 61 from rotating counterclockwise, as viewed in Figure 1. A torsion spring 64 acts on the retract pawl 62 and also acts on the drive pawl 59 through a finger 65 so that both pawls 59 and 62 are urged into engagement with the ratchet wheel 61. This ratchet mechanism 52 is typical of an output load for the gear trains 14 and 15 which rapidly changes load torque requirements. As the cam follower 55 is rising on the cam 57, a normal load will be presented to the motor 13. However, as the cam follower 55 drops off one of the pawls 56, there will momentarily be a no load condition, and additionally a considerable shock will be imparted to the output of the gear trains. This severe shock, especially in the varying torque requirements, indicates that a slip clutch or an overrunning clutch in the load speed gear train 15 would be unsatisfactory.

The present invention is one wherein the low speed gear train 15 is constantly in mesh with the motor drive shaft 20; hence, the output pinion 33 is constantly being driven as long as the motor 13 is rotating. The large shiftable gear 29 is many times larger than the pinions 21 and 33 and therefore, even though the pinion 21 may be rotating at about 3400 r.p.m., the shiftable gear 29 when in mesh therewith would be rotating at only about 270 r.p.m., for the gear reductions shown. At the same time the output pinion 33 would be rotating at only about 8 or 10 r.p.m. and thus, when the shiftable gear 29 was moved to be in mesh therewith, it would be driven at a speed of about 1 r.p.m. With the circuit so established that the solenoid 16 is energized at the same time as energization to the motor 13, the shiftable gear 29 would be shifted into mesh with the pinion 21 as the motor is accelerating to thus provide smooth and positive gear shifting into the high speed output condition. When the solenoid 16 is de-energized yet with the motor 21 still rotating, the shiftable gear 29 rotating at about 270 r.p.m. and decelerating will easily and positively mesh with the output pinion 33 which is rotating at about 8 r.p.m. and also decelerating during the shifting period, which is an extremely short period of time, because the spring 44 will instantly act.

Figure 5:
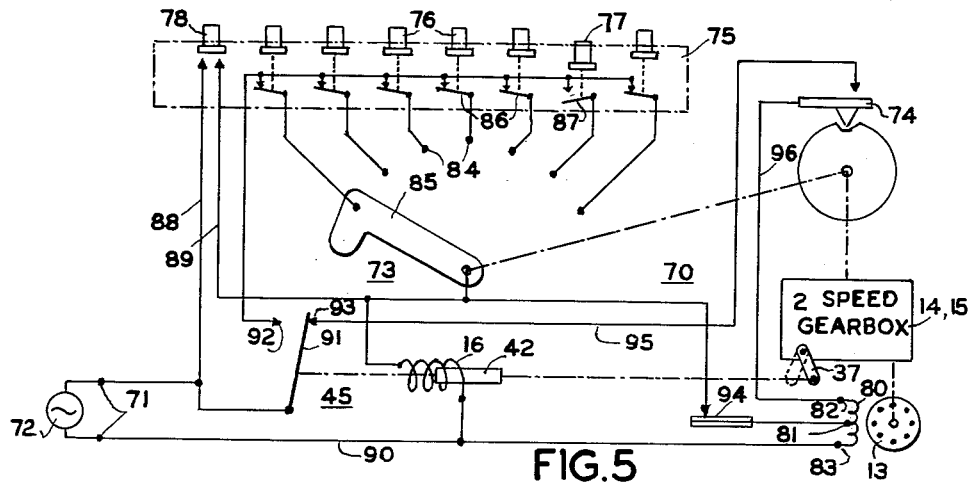
Figures 5 through 9 are various schematic diagrams of electrical circuits usable with the timer drive mechanism.

Figures 5 through 9 show various electrical circuit diagrams which may be used with the timer mechanism 11. Figure 5 shows a circuit 70 wherein the motor 13 is capable of being energized from energization terminals 71 of a voltage source 72, in this case shown as an alternating current source. The energization of the motor 13 is controlled through the switch means 45, a rotary switch 73, a main cam switch 74, and a remote switch 75. The rotary switch 73 and the main cam switch 74 form part of the output switch means 17 shown in Figure 2. The motor 13 drives the two-speed gear box 14, 15 which in turn drives the main cam switch 74 and the rotary switch 73. The shift lever 37 is shown as being actuated by the solenoid shaft 42 which also actuates the switch means 45.

The remote switch 75 is shown as being in a dot-dash rectangle to indicate that it may be, as an entirety, located remotely or at any desired location relative to the remainder of the circuit. Such remote switch 75 includes a plurality of push buttons 76, one of which 77 is shown as being actuated, and a start push button 78. The motor 13 has a stator winding 80 with a high energization terminal 81, a low energization terminal 82, and a common terminal 83. The rotary tap switch 73 is of the non-shorting type with a plurality of contacts 84 to be contacted by a switch arm 85. The contacts 84 are connected by conductors of any desired length to push button controlled normally closed switch contacts 86. When one of the push buttons is actuated, such as the push button 77, the switch contact 87 thereof will be opened. A conductor 88 connects the push button switch 78 to the energization terminal 71, and conductor 89 connects the push button switch 78 to one terminal of the solenoid 16, the other terminal of which is connected to a common conductor 90. The switch means 45 has a movable blade 91 connected to energization terminal 71 and has a set of double throw contacts 92 and 93. The normally open contact 92 is a hold-in contact for the solenoid 16. The rotary switch arm 85 is connected to conductor 89 which is connected through a bimetal or thermal overload switch 94 to the high energization terminal 81. The normally closed switch contact 93 is connected by a conductor 95 to the main cam switch 74 and through a conductor 96 to the low energization terminal 82.

When the start push button 78 is depressed, a circuit is made from energization terminal 71 through conductors 88 and 89 to energize the solenoid 16. This closes switch 91, 92 to act as a hold-in contact for the solenoid 16 through the rotary switch 73. The motor winding 80 has a tap at 81 so that the lower portion of this winding may be considered a high energization portion of the winding and this portion is connected in shunt with the solenoid 16. This means that the motor 13 begins to accelerate at about the same time that the solenoid 16 is actuated. This solenoid acting through shift lever 37 throws the swingable lever 23, shown in Figure 1, so that the large shiftable gear 29 comes into mesh with the first pinion section 21. The fact that the motor 13 is accelerating from rest during the shifting operation assures that the gear shifting will be accomplished swiftly and positively without stripping of gears, as aided by the generally radial movement of the gear shifting as opposed to axial movement.

The initial movement of the switch means 17 at high speed, because of the high speed gear train 14 being in use, causes the main cam switch 74 to close. The timer drive mechanism 11 will operate in the high energization condition of motor 13 and the high speed condition of the gear train 14 until the rotary switch arm 85 is moved to an open circuit position. As shown in Figure 5, this will be when the switch 87 is placed in the circuit. Assuming push button 77 has been actuated, this opened switch 87 will cause de-energization of the solenoid 16. This does two things; namely, to shift the swingable lever 23 so as to activate the low speed gear train 15, and it also opens switch contact 92 and closes switch contact 93. Since the main cam switch 74 was closed upon initial movement of the motor, energization is supplied to the motor winding 80 at the low energization terminal 82. Thus, the timer drive mechanism 11 continues to operate at the low energization condition of motor 13 and the low speed gear train 14. This drives the output switch means 17 at a low speed, for example, two revolutions per hour. In the high speed and high energization condition the output switch means 17 may be driven at about 3 or 4 r.p.m. or, in other words, about one complete revolution in about fifteen or twenty seconds.

Since the high speed condition of the output switch means 17 requires more torque input than the low speed input condition, the tapped motor winding 80 is advantageous. By using a smaller number of turns in the high energization portion of this winding, higher energization may be supplied to the motor because the higher current, even though applied to fewer turns, meets considerably less inductive reactance so that the current increases faster than the number of turns decreases; and hence, the total ampere turns is increased for increased energization. This permits the motor 13 to be considerably smaller in normal output torque than it normally otherwise would be because in this particular application the higher energization condition is only encountered for a maximum of fifteen or twenty seconds, just enough for the setting cycle to set the timer at the prescribed point, as dictated by the actuated push button 77, and from then on the low speed low energization condition is utilized for slow speed driving during the timing cycle. The motor may have a continuous duty rating commensurate with the torque requirements during this timing cycle and may be considerably overloaded during the setting cycle of high torque requirements during high energization and high speed gear ratio. Since this setting cycle is only encountered for a short time, an intermittent duty rating may be applied to the motor so that it may be considerably overloaded during the setting cycle relative to the continuous duty rating.

Figure 6:
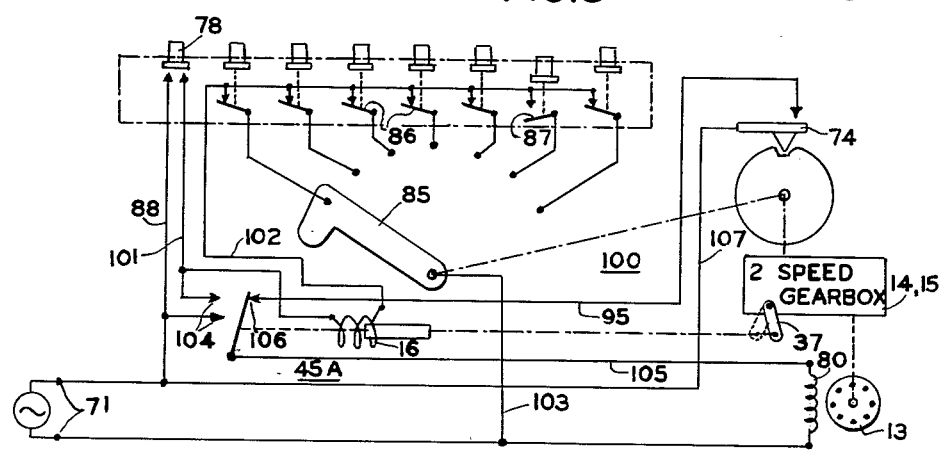

Figure 6 shows an alternative circuit 100. In this circuit, when the start push button 78 is depressed, the solenoid 16 is energized through the conductor 88, a conductor 101, and a conductor 102, any one of the switch contacts 86, switch arm 85, and a conductor 103. The solenoid actuates the double throw switch means 45A which, when energized, closes hold-in contacts 104. Energization is supplied to the motor winding 80 through a conductor 105 and one of the hold-in contacts 104. When the switch arm has been driven by the high speed gearing 44 until the actuated switch contacts 87 are encountered, the holding circuit for the solenoid 16 is broken to de-energize the solenoid closing the normally closed contacts 106. This provides energization for the motor through conductors 95 and 107, the main cam switch 74, and contact 106. In this circuit 100 the motor is not provided with a tapped winding, instead only two terminals on the winding are used. This means that the motor 13 shall have to be large enough to drive the load in the high speed condition but adds simplicity in eliminating need for the tapped winding.

Figure 7:
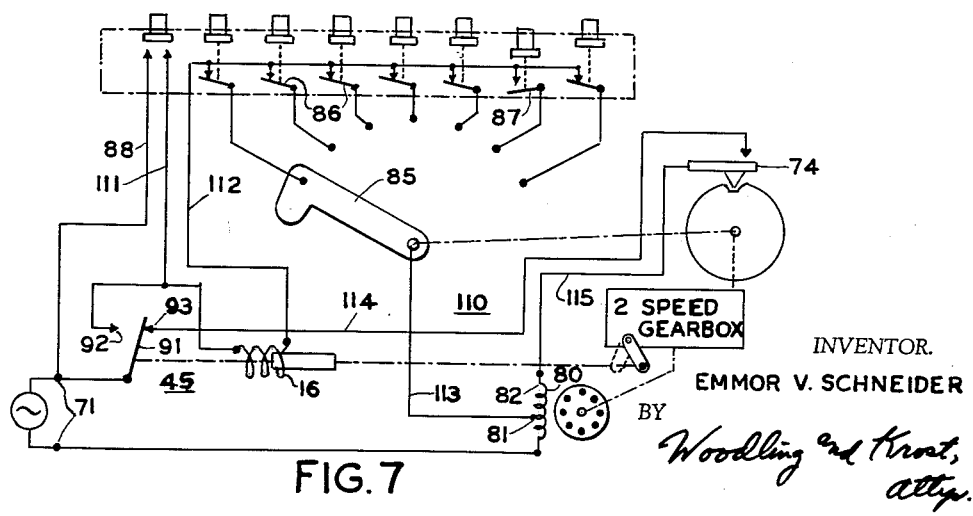

Figure 7 shows circuit 110 with a series solenoid arrangement. When the start push button 78 is depressed, energization is supplied to the motor winding 80 at the lower portion thereof through conductor 88, a conductor 111, the solenoid 16, a conductor 112, the switch contacts 86, switch arm 85, and a conductor 113. This circuit 110 allows for simplification of contacts at the switch means 45 again using only blade 91, normally open contact 92, and normally closed contact 93. Upon energization of the solenoid 16, contact 92 closes as a hold-in contact. The rotary switch arm 85 and main cam switch 74 are driven at high speed and again the initial movement closes main cam switch 74. When the rotary switch arm 85 comes to the actuated switch contact 87, the holding circuit through the solenoid 16 is broken, de-energizing it, and deenergizing the high energization portion of the motor winding 80. This ends the setting cycle of the timer drive mechanism. With the switch contact 93 closed, energization to the low energization terminal 82 is supplied through a conductor 114, the main cam switch 74, and a conductor 115. The timing cycle thus continues until the main cam switch 74 completes one full revolution at which time this cam switch 74 opens to de-energize the entire timer drive mechanism and again place it in readyness for starting another cycle. It will readily be understood that the rotary switch 73 in the Figures 5 through 9 is shown at the start position. Also, it will be understood that the actuated switch contact 87 may be at any position throughout the full circle of movement of the switch arm 85.

Figure 8:
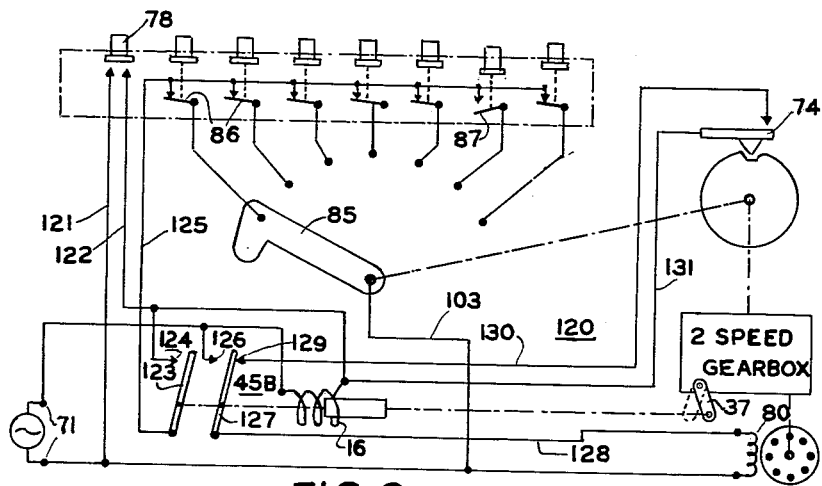

Figure 8 shows a circuit 120. In this circuit, when the start push button 78 is depressed, energization to the solenoid 16 is effected through a conductor 121 and conductor 122. The switch means 45B actuated by the solenoid 16 has a blade 123 and contact 124 which close as hold-in contacts for the solenoid 16, through a conductor 125, contacts 86, switch arm 85, and conductor 103. Energization is supplied to the motor winding 80 through normally open contact 126, blade 127, and a conductor 128. When the actuated switch contact 87 is reached by the switch arm 85, the holding circuit through the solenoid 16 is broken to de-energize it, and blade 127 closes against a contact 129. This provides energization to the motor winding 80 through the main cam switch 74, conductor 130, conductor 131, and solenoid 16. It will be noted that in this timing cycle or slow speed drive of the cam switch 74 and switch arm 85, the solenoid 16 is in series with the motor winding 80. This reduces the current in and heating of the motor. This is permissible because the torque requirement during the timing cycle is small in relation to the torque requirement of the high speed or setting cycle. In the setting cycle the solenoid 16 is in shunt with the motor winding 80. During the timing cycle, the solenoid 16 is in series with the motor winding 80 so that current flows through the solenoid 16 but does not energize it sufficiently to actuate the contacts of the switch 45B nor to actuate the shift lever 37. In this timing cycle the solenoid 16 acts merely as an impedance to limit the current to the motor winding 80; and thus, there is lower energization supply to the motor winding 80 during this timing cycle than during the setting cycle.

Figure 9:
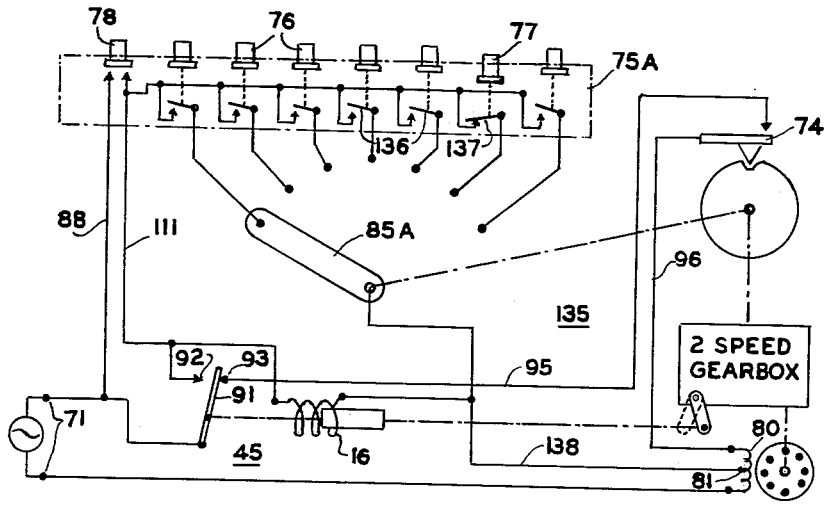

Figure 9 shows a circuit 135 wherein a remote switch 75A is used which utilizes normally open switch contacts 136. These contacts are again actuated by the push buttons 76, and an actuated push button 77 is shown as having closed a contact 137. A switch arm 85A is used which is not of the shorting type. When the start push button 78 is depressed, a circuit is made through conductors 88 and 111 to the solenoid 16 and through it and a conductor 138 to the high energization tap 81. This energizes the solenoid 16 and the high energization portion of the motor winding 80 to run the motor for the setting cycle. The energization of the solenoid 16 closes the switch blade 91 against contact 92 to provide a hold-in contact for the solenoid 16. The setting cycle is completed when the rotary arm 85 encounters the closed circuit switch 137 at which point the solenoid 16 is short circuited. This causes this solenoid to be de-energized, closing blade 91 against contact 93. From then on the timing cycle is provided with energization to the entire motor winding 80 being supplied through conductors 95 and 96. The momentary short circuit on the solenoid presents a momentary overload on the high energization portion of the motor winding 80 but, since this is only for a short time, it does no harm to the motor winding. The impedance of the solenoid 16 and the impedance of the motor winding 80, especially the high energization portion thereof, may be so proportioned that the motor receives greater energization during the setting cycle than during the timing cycle. The fact that the remote switch 75A is of the open circuit variety rather than the closed circuit variety, shown in Figures 5 through 8, may be of advantage in many cases in establishing a longer life in the contacts.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drive mechanism, including, a drive shaft, a pinion on said drive shaft, a shiftable gear considerably larger than said pinion, mounting means journalling said shiftable gear for radial shiftable movement relative to said pinion, a low speed power train having an output and having an input driven from said drive shaft, power means connected to move said shiftable gear between driving conditions with said pinion and with said low speed power train output, switch means driven from said shiftable gear, first circuit means connected to effect rotation of said drive shaft to drive said switch means, and second circuit means controlled by said switch means to control energization to said power means.

2. A timer drive mechanism, including, an electric motor having a drive shaft, a pinion on said drive shaft, a shiftable gear many times larger than said pinion, mounting means journalling said shiftable gear for shiftable movements relative to said pinion, low speed gearing having an output and having an input constantly driven from said motor, said pinion and said low speed gearing output being at different arcuate positions relative to said shiftable gear, power means connected to move said shiftable gear between driving conditions with said pinion and with said low speed gearing output, switch means of rapidly varying input torque requirements driven from said shiftable gear, first circuit means connected to energize said motor to drive said switch means, and second circuit means controlled by said switch means to control energization to said power means.

3. A drive mechanism, including, a frame, an electric motor having a drive shaft, a pinion on said drive shaft, a shiftable gear many times larger than said pinion, mounting means journalling said shiftable gear for shifting movements on said frame, low speed gearing having an output and having an input constantly driven from said motor, said pinion and said low speed gearing output being at different arcuate positions relative to said shiftable gear, power means connected to move said shiftable gear between driving conditions with said pinion and with said low speed gearing output, an intermittent load driven from said shiftable gear, circuit means connected to energize said motor to drive said load at high speed, and switch means controlled by said load to control energization to said power means to effect power transmission through said low speed gearing to drive said load at low speed.

4. A drive mechanism, including, a frame, an electric motor having a high speed drive shaft, a first pinion on said drive shaft, a lever pivoted on said frame, a shiftable gear many times larger than said first pinion, means journalling said shiftable gear on said lever, low speed gearing having an output and having an input constantly driven from said motor, said first pinion and said low speed gearing output being at different arcuate positions relative to said shiftable gear, power means connected when energized to move said lever to mesh said shiftable gear and said first pinion and when de-energized to move said lever to drive said shiftable gear from said low speed gearing output, an intermittent load driven from said shiftable gear, circuit means connected to energize said motor and to energize said power means to drive said load at high speed, and switch means controlled by load to de-energize said power means for power transmission through said low speed gearing to drive said load at low speed.

5. A drive mechanism, including, a frame, an electric motor having a high speed drive shaft, a first pinion on said drive shaft, a lever pivoted on said frame, a shiftable gear many times larger than said first pinion, means journalling said shiftable gear on said lever, low speed gearing having an output and having an input constantly driven from said motor, said low speed gearing having a rotational direction opposite to the input, said first pinion and said low speed gearing output being on opposite sides of said shiftable gear, power means connected when energized to move said lever to mesh said shiftable gear and said first pinion and when de-energized to move said lever to drive said shiftable gear from said low speed gearing output, an intermittent load driven from said shiftable gear, switch means actuated by said power means, circuit means interconnecting said switch means and said motor to energize said motor and to energize said power means to drive said load at high speed, and second switch means controlled by said load to de-energize said power means for power transmission through said low speed gearing to drive said load at low speed.

6. A timer, including, a frame, a small high speed electric motor having a drive shaft, a first pinion on said drive shaft, an output gear journalled on said frame, a lever pivoted on said frame, a shiftable gear many times larger than said first pinion, a second gear meshing with said output gear and coaxially connected to said shiftable gear, means journalling said second gear and said shiftable gear on said lever, low speed gearing having an output and having an input constantly driven from said motor, said low speed gearing having a rotational direction opposite to the input, said first pinion and said low speed gearing output being on opposite sides of said shiftable gear, means including a solenoid connected to move said lever when energized to mesh said shiftable gear and said first pinion and when de-energized to drive said shiftable gear from said low speed gearing output, an intermittent load driven from said output gear, switch means actuated by said solenoid, circuit means interconnecting said switch means and said motor to energize said motor and to energize said solenoid to drive said load at high speed, and means controlled by said load to de-energize said solenoid and to establish power transmission through said low speed gearing to continue moving said load at low speed.

7. A timer motor comprising, a shaded pole induction motor having an output shaft, a small first pinion section on said output shaft, a second small pinion section on said output shaft, a low speed gear train constantly in mesh with said second pinion section, a low speed output pinion from said low speed gear train, a large gear greater than ten times the diameter of said first pinion section, a lever journalling said large gear, means including a solenoid acting on said lever to move same and hence arcuately move said large gear between first and second operative positions in mesh with said first pinion section and said low speed gear output pinion, respectively, means to energize said solenoid and said motor at substantially the same time to cause acceleration of said motor to high speed of about 3400 r.p.m. and simultaneous arcuate movement of said large gear to said first operative position for meshing of said large gear and said first pinion section for rotation of said large gear at about 270 r.p.m. and rotation of said low speed output pinion at about 8 r.p.m., and means de-energizing said solenoid and arcuately moving said large gear to the second operative position in mesh with said low speed output pinion whereat both said large gear and said output pinion are moving relatively slowly to permit radial intermeshing thereof to thereafter rotate said large gear at approximately 1 r.p.m.

8. A timer motor and gear train for a cam operated switch mechanism comprising a high speed electric motor having an output shaft, a low speed gear train having an input and an output, first and second pinion sections on said motor shaft, said inuput being constantly in mesh with said second pinion section, a pinion on the output of said low speed gear train, a pivoted lever having first and second ends, a solenoid connected to move said lever first end between first and second positions, a bearing on said lever, a shiftable gear journalled in said bearing, said low speed gear train output pinion having an axis parallel with said motor shaft, said first position of said lever establishing said shiftable gear in mesh with said first pinion section and out of mesh with said output pinion, said second position of said lever establishing said shiftable gear in mesh with said output pinion and out of mesh with said first pinion section on said motor shaft, said bearing being substantially on a line intersecting said motor shaft and said low speed gear train output pinion, a second gear directly and coaxially connected to said shiftable gear to rotate therewith, an output gear meshing with said second gear at a radial point substantially perpendicular to said intersecting line whereby said second and output gears remain constantly in mesh during speed change movements of said shiftable gear, and switch contacts controlled by said solenoid to control a function relating to high speed and low speed conditions of said output gear.

9. A timer, including, a small high speed electric motor having a drive shaft, first and second pinion sections on said drive shaft, an output gear journalled on a first axis, a lever pivoted at said first axis, a shiftable gear many times larger than said first pinion section, a second gear meshing with said output gear and coaxially connected to said shiftable gear, means journalling said second gear and said shiftable gear on said lever, a low speed gear train having an output pinion and having an input constantly in mesh with said second pinion section, said low speed gear train having a rotational direction opposite to the input, said first pinion section and said output pinion being on opposite sides of said shiftable gear, a solenoid connected to move said lever when energized to mesh said shiftable gear and said first pinion section, spring means connected to move said lever when said solenoid is de-energized to mesh said shiftable gear and said output pinion, a ratchet mechanism driven from said output gear having rapidly varying load conditions, low and high energization conditions of said motor, double throw switch means actuated by said solenoid, circuit means interconnecting said switch means and said motor to energize said motor in the high energization condition and to energize said solenoid to drive said ratchet mechanism at high speed, and means controlled by said ratchet mechanism to de-energize said solenoid, to establish the low speed condition of said gear train and to simultaneously establish the low energization condition of said motor to continue moving said ratchet mechanism at low speed.

10. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, double throw switch means actuated by said solenoid, circuit means interconnecting said switch means and said motor terminals, means to energize said motor and to energize said solenoid to drive said ratchet mechanism at high speed, and means controlled by said ratchet mechanism to de-energize said solenoid and to establish said low speed gear train in effect to continue moving said ratchet mechanism at low speed.

11. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, low and high energization terminals on said motor, double throw switch means actuated by said solenoid, circuit means interconnecting said switch means and said motor terminals, means to energize said motor in the high energization condition and to energize said solenoid to drive said ratchet mechanism at high speed, thermal protection means for said motor high energization condition, and means controlled by said ratchet mechanism to de-energize said solenoid and to simultaneously establish the low energization condition of said motor to continue moving said ratchet mechanism at low speed.

12. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, only first and second energization terminals on said motor, double throw switch means actuated by said solenoid, circuit means interconnecting said switch means and said motor terminals, means to energize said motor and said solenoid to drive said ratchet mechanism at high speed, and second switch means controlled by said ratchet-mechanism to de-energize said solenoid and eliminate it from the circuit to continue moving said ratchet mechanism at low speed.

13. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, low and high energization terminals on said motor, double throw switch means actuated by said solenoid, circuit means interconnecting said switch means and said motor terminals, means to energize said solenoid in series with said motor high energization terminal to drive said ratchet mechanism at high speed, and second switch means controlled by said ratchet mechanism to open circuit said solenoid to de-energize same and to establish energization to the low energization terminal of said motor to continue moving said ratchet mechanism at low speed.

14. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, only first and second energization terminals on said motor, double throw switch means actuated by said solenoid, circuit means interconnecting said switch means and said motor terminals, means to energize said motor and said solenoid in parallel to drive said ratchet mechanism at high speed, and second switch means controlled by said ratchet mechanism to connect said solenoid and said motor terminals in series to reduce the energization to said solenoid to de-actuate same and to establish a lower energization condition of said motor to continue moving said ratchet mechanism at low speed.

15. A timer, including a shaded pole sub-fractional horsepower induction motor having a drive shaft, first and second pinion sections on said drive shaft, an output gear journalled on a first axis, a lever pivoted at said first axis, a large shiftable gear having approximately twelve times the number of teeth as said first pinion section, a second gear meshing with said output gear and coaxially connected to said shiftable gear, means journalling said second gear and said shiftable gear on said lever, low speed gearing having an input and an output, said input being constantly in mesh with said second pinion section, said first and second pinion sections having the same number of teeth, an even plurality of gear sets in said low speed gearing so that the output thereof has a rotational direction opposite to the input, an output pinion at said low speed gear train output, said first pinion section and said output pinion being on substantially diametrically opposite sides of said shiftable gear, said lever being swingable between first and second positions to mesh said shiftable gear by lateral movements with said first pinion section and said output pinion respectively, a solenoid connected to move said lever to said first position when energized, spring means to move said lever to said second position when said solenoid is de-energized, a ratchet mechanism driven from said output gear having first and second conditions of normal load and substantially no load, respectively, and with very rapid change from normal load to no load conditions, low and high energization terminals on said motor, double throw switch means actuated by said solenoid, circuit means interconnecting said switch means and said motor terminals, means to energize said solenoid in series with said motor high energization terminal to drive said ratchet mechanism at high speed, and second switch means controlled by said ratchet mechanism to momentarily short circuit said solenoid to de-energize same and to establish energization to the low energization terminal of said motor to continue moving said ratchet mechanism at low speed.

16. A gear assembly including, a frame, a high speed drive shaft, a first pinion on said drive shaft, an output gear journalled on said frame, a lever pivoted on said frame, a shiftable gear many times larger than said first pinion, a second gear meshing with said output gear and coaxially connected to said shiftable gear, means journalling said second gear and said shiftable gear on said lever, low speed gearing having an output and having an input constantly driven from said drive shaft, said low speed gearing having a rotational direction opposite to the input, said first pinion and said low speed gearing output being on opposite sides of said shiftable gear, means connected to move said lever in one direction to mesh said shiftable gear and said first pinion and in the opposite direction to mesh said shiftable gear and said low speed gearing output, and an intermittent load driven from said output gear.

17. A gear assembly comprising, an input shaft, a small first pinion section on said input shaft, a second small pinion section on said input shaft, a low speed gear train constantly in mesh with said second pinion section, a low speed output pinion from said low speed gear train, a large gear greater than ten times the diameter of said first pinion section, a lever journalling said large gear, means acting on said lever to move same and hence arcuately move said large gear between first and second operative positions in mesh with said first pinion section and said low speed gear output pinion, respectively, means to move said lever and to initiate rotation of said input shaft at substantially the same time to cause acceleration of said input shaft to high speed and simultaneous arcuate movement of said large gear to said first operative position for meshing of said large gear and said first pinion section for rotation of said large gear and rotation of said low speed output pinion at an intermediate speed, and means to move said lever in the opposite direction to arcuately move said large gear to the second operative position in mesh with said low speed output pinion whereat both said large gear and said output pinion are moving relatively slowly to permit radial intermeshing thereof to thereafter rotate said large gear at a low speed.

18. A gear assembly comprising, a high speed input shaft, a low speed gear train having an input and an output, first and second pinion sections on said input shaft, said gear train input being constantly in mesh with said second pinion section, a pinion on the output of said low speed gear train, a pivoted lever having first and second ends, means to move said lever first end between first and second positions, a bearing on said lever, a shiftable gear journalled in said bearing, said low speed gear train output pinion having an axis parallel with said input shaft, said first position of said lever establishing said shiftable gear in mesh with said first pinion section and out of mesh with said output pinion, said second position of said lever establishing said shiftable gear in mesh with said output pinion and out of mesh with said first pinion section on said input shaft, said bearing being substantially on a line intersecting said motor shaft and said low speed gear train output pinion, a second gear directly and coaxially connected to said shiftable gear to rotate therewith, and an output gear meshing with said second gear at a radial point susbtantially perpendicular to said intersecting line whereby said second and output gears remain constant in mesh during speed change movements of said shiftable gear.

References Cited in the file of this patent

UNITED STATES PATENTS

| | | |
|---|---|---|
| 2,292,304 | Strong | Aug. 4, 1942 |
| 2,391,718 | Lindemann | Dec. 25, 1945 |
| 2,856,787 | Haupt | Oct. 21, 1958 |